US008327136B2

(12) United States Patent
Lee et al.

(10) Patent No.: US 8,327,136 B2
(45) Date of Patent: *Dec. 4, 2012

(54) INTER-ENTITY COUPLING METHOD, APPARATUS AND SYSTEM FOR CONTENT PROTECTION

(75) Inventors: Byung-Rae Lee, Seoul (KR); Sung-Oh Hwang, Yongin-si (KR); Wuk Kim, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 1093 days.

This patent is subject to a terminal disclaimer.

(21) Appl. No.: 11/409,150

(22) Filed: Apr. 21, 2006

(65) Prior Publication Data

US 2007/0061568 A1    Mar. 15, 2007

(30) Foreign Application Priority Data

Sep. 15, 2005  (KR) .......................... 10-2005-0086394

(51) Int. Cl.
  *G06F 21/00*  (2006.01)
(52) U.S. Cl. ........................................................ 713/163
(58) Field of Classification Search .................. 726/2, 4, 726/6, 26–30; 713/163
  See application file for complete search history.

(56) References Cited

U.S. PATENT DOCUMENTS

| 6,636,968 | B1 | 10/2003 | Rosner et al. | |
|---|---|---|---|---|
| 7,055,030 | B2 | 5/2006 | Negawa | |
| 7,185,362 | B2* | 2/2007 | Hawkes et al. | 726/4 |
| 7,617,158 | B2* | 11/2009 | Bjorkengren et al. | 705/51 |
| 2002/0163481 | A1 | 11/2002 | Takamine | |
| 2003/0236896 | A1 | 12/2003 | Isomaki et al. | |
| 2004/0151315 | A1* | 8/2004 | Kim | 380/241 |
| 2004/0236942 | A1 | 11/2004 | Kim et al. | |
| 2006/0117314 | A1* | 6/2006 | Sato | 717/174 |
| 2007/0061886 | A1* | 3/2007 | Le | 726/26 |

(Continued)

FOREIGN PATENT DOCUMENTS

CN  1574756  2/2005

(Continued)

OTHER PUBLICATIONS

Mobile Broadcast Services Architecture, Draft Version 1.0, Apr. 20, 2005; Open Mobile Alliance, OMA-AD-BCAST-V1_0-200050420-D.

(Continued)

*Primary Examiner* — Jeffrey Pwu
*Assistant Examiner* — Anthony Brown
(74) *Attorney, Agent, or Firm* — The Farrell Law Firm, P.C.

(57) ABSTRACT

Disclosed is an inter-entity coupling method for protecting content in a broadcast environment including a broadcast network and a terminal, the broadcast network having a Broadcast Service Application (BSA), a Broadcast Service Distribution (BSD), and a Broadcast Service Management (BSM), the inter-entity coupling method including performing, by the terminal, a registration process for obtaining a group key for the terminal; after the registration process is completed, performing, by the terminal, a service joining process for requesting service joining, and receiving, by the terminal, a Rights Object (RO) about the content from a message, which is received in response to the request, based on the obtained group key; obtaining a traffic key by using the RO, if a traffic key message is received after the service joining process is completed; receiving encrypted content in the terminal; and decrypting the encrypted content by using the traffic key.

25 Claims, 6 Drawing Sheets

U.S. PATENT DOCUMENTS

2009/0064341 A1* 3/2009 Hartung et al. .................. 726/27

FOREIGN PATENT DOCUMENTS

| | | |
|---|---|---|
| JP | 2002-358244 | 12/2002 |
| JP | 2003-069547 | 3/2003 |
| JP | 2004-023237 | 1/2004 |
| KR | 1020010029724 A | 4/2001 |
| KR | 1020040001364 A | 1/2004 |
| KR | 10200500040644 | 5/2005 |
| WO | WO 03/009627 | 1/2003 |
| WO | WO 2005/034565 | 4/2005 |

OTHER PUBLICATIONS

DRM Specification V2.0, Draft Version 2.0, Apr. 20, 2004; Open Mobile Alliance, OMA-DRM-DRM-V2_0-20040420-D.

Service and Content Protection for Mobile Broadcast Services, Draft Version 1.0, Aug. 29, 2005; Open Mobile Alliance, OMA-TS-BCAST_SvcCntProtection-V1_0-20050829-D.

Nariman Molavi et al., A Security Study of Digital TV Distribution Systems, Jun. 2005.

* cited by examiner

| ID_T | RND(1) | TS(1) | Sign_T(ID_T ‖ RND(1) ‖ TS(1)) |

FIG.5A

| ID_SP | RND(2) | E(PK_T,GK) | TS(2) | Sign_SP(ID_SP ‖ RND(2) ‖ E(PK_T,GK) ‖ TS(2)) |

FIG.5B

| ID_T | ID_Service | RND(3) | TS(3) |

FIG.5C

| ID_SP | RND(4) | E(GK,RO) | TS(4) | Sign_SP(ID_SP ‖ RND(4) ‖ E(GK,RO) ‖ TS(4)) |

FIG.5D

| ID_SP | E(SK,TK) | TS(5) | Sign_SP(ID_SP ‖ E(SK,TK) ‖ TS(5)) |

FIG.5E

| ID_SP | E(TK, Contents) | TS(6) |

INTER-ENTITY COUPLING METHOD, APPARATUS AND SYSTEM FOR CONTENT PROTECTION

PRIORITY

This application claims priority under 35 U.S.C. §119 to an application entitled "Inter-Entity Coupling Method, Apparatus And System For Content Protection" filed in the Korean Industrial Property Office on Sep. 15, 2005, and assigned Serial No. 2005-86394, the contents of which are incorporated herein by reference.

BACKGROUND OF THE INVENTION

1. Field of the Invention

The present invention relates to an inter-entity coupling method, an inter-entity coupling apparatus, and an inter-entity coupling system for content protection in a broadcast environment.

2. Description of the Related Art

In general, a broadcast service refers to a service scheme in which if a server controlling the broadcast service transmits an encrypted service, then a plurality of terminals can receive the encrypted service.

At present, a greater number of broadcast services are changing from a free-service into a charged service, (e.g., a pay-to-view service). A Digital Rights Management (DRM) technology using a user's Rights Object (RO) has been introduced because of a necessity to provide a copyright protection technology for preventing indiscriminate reproduction and distribution of content (e.g., digital content).

Content provided from a service provider is protected as shown in FIG. 1, which is a diagram illustrating the configuration of a conventional common DRM system. The DRM technology is a typical security technique for protecting content, and to prescribe a right-of-use for encrypted content. Devices and/or systems which use the DRM technology include a terminal 3 which reproduce content using an RO, and a Rights Issuer (RI) which can create and issue the RO defining the rights of use for the content and so forth. This RI belongs to a service provider 5.

The terminal 3 establishes a safe channel through an authentication procedure with the RI, and acquires the RO over the established channel. At this time, since the RO is decrypted by means of the DRM technology, it is possible to prevent the contents from being used without authorization. That is, multimedia information included in the encrypted content cannot be reproduced before the encrypted content is decrypted and executed by means of the DRM technology through such an RO.

Conventional content protection methods perform an authentication procedure between a service provider and only a single terminal. Moreover, a related standard in a mobile communication environment includes the Open Mobile Alliance (OMA) DRM v2.0 technology, which is used by content providers to define how content can be used. However, a concrete standard related to content protection for a plurality of terminals using the broadcast service in the mobile communication environment is not yet proposed.

Furthermore, although several content protection methods in the broadcast environment exist in the 3$^{rd}$ Generation Partnership Project (3GPP), 3GPP2, etc., networks these content protection methods are dependent on networks in which they are used (e.g., the 3GPP network and so forth).

As stated above, conventional content protection methods are based on the existing 3GPP network, and detailed methods regarding how entities participating in a broadcast network operate in order to protect digital content have not yet been proposed.

SUMMARY OF THE INVENTION

Accordingly, the present invention has been made to solve at least the above-mentioned problems occurring in the prior art, and an object of the present invention is to provide an inter-entity coupling method, an inter-entity coupling apparatus and an inter-entity coupling system for contents protection in a broadcast environment.

In order to accomplish this object, in accordance with one aspect of the present invention, there is provided an inter-entity coupling method for protecting content in a broadcast environment including a broadcast network and a terminal, the broadcast network having a Broadcast Service Application (BSA), a Broadcast Service Distribution (BSD), and a Broadcast Service Management (BSM), the inter-entity coupling method including performing, by the terminal, a registration process for obtaining a group key for the terminal; after the registration process is completed, performing, by the terminal, a service joining process for requesting service joining, and receiving, by the terminal, a Rights Object (RO) about the content from a message, which is received in response to the request, based on the obtained group key; obtaining a traffic key by using the RO, if a traffic key message is received after the service joining process is completed; receiving encrypted content in the terminal; and decrypting the encrypted content by using the traffic key.

In order to accomplish this object, in accordance with another aspect of the present invention, there is provided an inter-entity coupling method for protecting content in a broadcast environment including a broadcast network and a terminal, the broadcast network including a Broadcast Service Application (BSA), a Broadcast Service Distribution (BSD), and a Broadcast Service Management (BSM, the inter-entity coupling method including receiving, in the BSM, a registration request from the terminal; transmitting, from the BSM to the terminal, a registration response message including group key about a group to which the terminal belongs; obtaining, by the terminal, the group key from the received registration response message; requesting, by the terminal, to join in a service; generating and transmitting, by the BSM, a message including a Rights Object (RO) about the service to the terminal; obtaining, by the terminal, the RO about the service from the received message including the RO by using the group key; transferring, from the BSM to the BSA, a traffic key used for encrypting content; receiving, in the terminal, a traffic key message; obtaining, by the terminal, the traffic key from the traffic key message by using the RO; receiving, in the BSA, content from a content provider; encrypting the received content by using the traffic key; transmitting the encrypted content to the terminal; and decrypting, by the terminal, the encrypted content by using the traffic key.

In order to accomplish this object, in accordance with further another aspect of the present invention, there is provided an inter-entity coupling system for protecting content in a broadcast environment, the inter-entity coupling system comprising a terminal; a content provider for generating content and transferring the generated content; a Broadcast Service Application (BSA) for encrypting the content by using a traffic key and transmitting the encrypted content to the terminal through a Broadcast Service Distribution (BSD); a Broadcast Service Management (BSM) for performing a registration process and a service joining management process with the terminal, and generating a traffic key message including a traffic key used for encrypting the content; the BSD for receiving the traffic key message from the BSM and transmitting the received traffic key message to the terminal; and wherein the terminal obtains the traffic key by using a Rights Object (RO) acquired at service joining when the traffic key message is received, and decrypts the encrypted content using the obtained traffic key.

In order to accomplish this object, in accordance with still another aspect of the present invention, there is provided an inter-entity coupling system for protecting content in a broadcast environment including a broadcast network and a terminal, the broadcast network having a Broadcast Service Application (BSA), a Broadcast Service Distribution (BSD), and a Broadcast Service Management (BSM), the inter-entity coupling terminal including a first component for receiving an encrypted stream content from the BSD; a second component for receiving an encrypted file content and at least one encryption key from the BSD; a third component for encrypting the encrypted content transmitted from the BSD; a fourth component for transmitting the at least one encryption key received from the BSM to the third component; wherein the fourth component performs a registration and service joining process.

In order to accomplish yet a further object, in accordance with another aspect of the present invention, there is provided an inter-entity coupling terminal apparatus for protecting content in a broadcast environment including a broadcast network and the terminal, the broadcast network including a Broadcast Service Application (BSA), a Broadcast Service Distribution (BSD), and a Broadcast Service Management (BSM), the inter-entity coupling terminal apparatus includes a Digital Rights Management (DRM) module for managing registration, service joining, and use of content; a communication module for exchanging a message with the BSM, and receiving a traffic key message and an encrypted service from the BSD; and an authentication module for obtaining at least an encryption key by verifying a message received from the BSM or BSD.

BRIEF DESCRIPTION OF THE DRAWINGS

The above and other objects, features and advantages of the present invention will be more apparent from the following detailed description taken in conjunction with the accompanying drawings, in which:

FIGS. 5A-5F are diagrams illustrating the format of a message transmitted/received according to a service protection scheme of the present invention.

DETAILED DESCRIPTION OF THE PREFERRED EMBODIMENT

Figure 1:
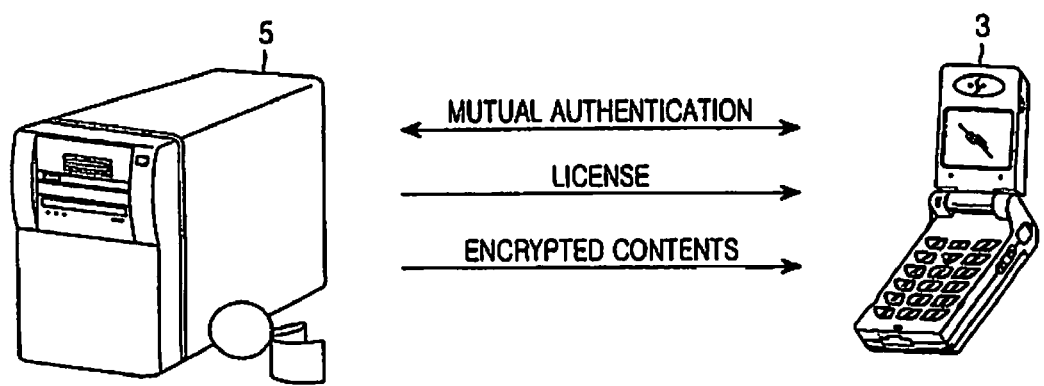
FIG. 1 is a block diagram illustrating the configuration of a conventional DRM system.

Hereinafter, preferred embodiments of the present invention will be described with reference to the accompanying drawings. It should be noted that similar components are designated by similar reference numerals although they are illustrated in different drawings. Also, in the following description, a detailed description of known functions and configurations incorporated herein will be omitted when it may obscure the subject matter of the present invention.

The present invention is drawn to a system and a method for protecting broadcast content from unauthorized use. More particularly, according to the present invention entities constituting a broadcast network interact with one another to protect broadcast content from unauthorized use and to transmit the broadcast content to one or more receiving terminals. To this end, the present invention enables a service broadcasted to a terminal to be safely transmitted and reproduced through transmission/reception and operation of a corresponding message according to the roles of the terminal and the respective entities.

Figure 2:
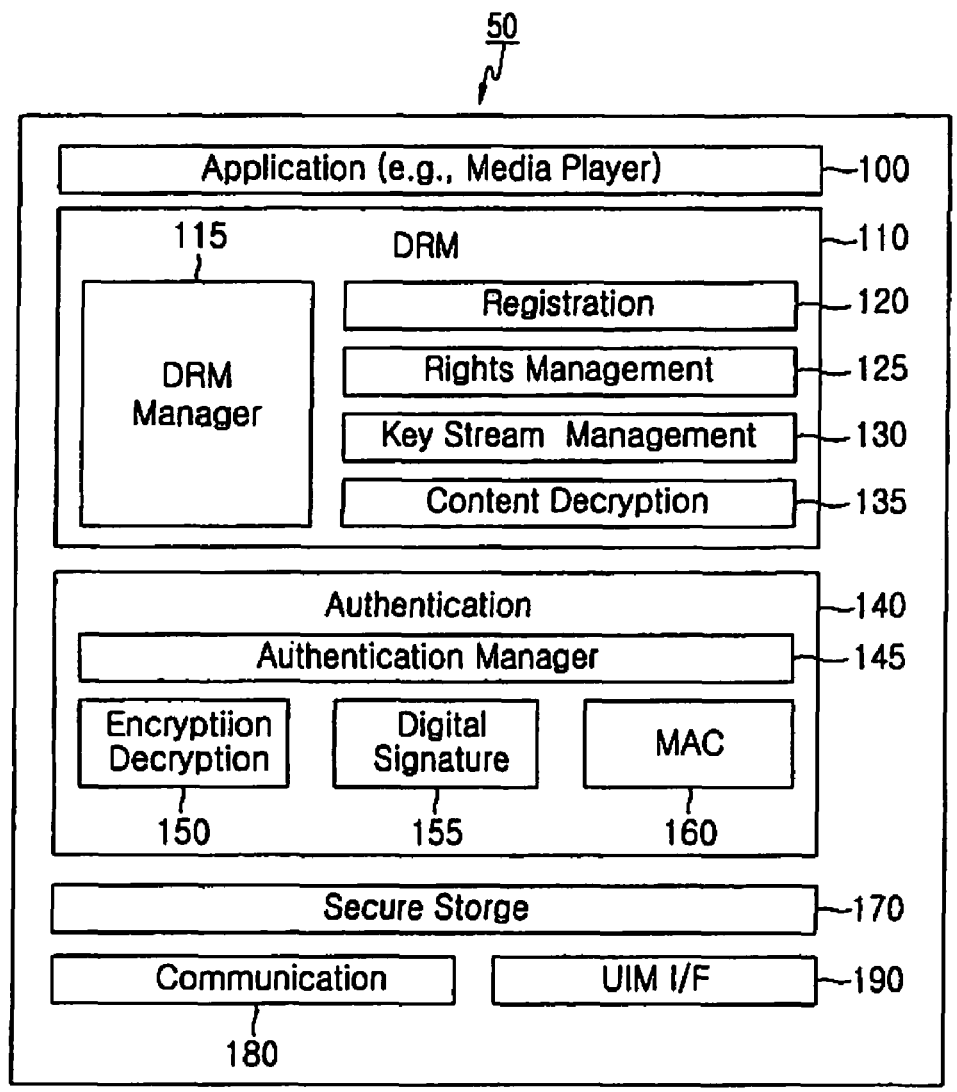
FIG. 2 is a block diagram illustrating the internal structure of a terminal in accordance with the present invention.

Hereinafter, a terminal in which such a function is implemented will be described with reference to FIG. 2 which is a block diagram illustrating the internal structure of a terminal according to the present invention. Terminal 50 includes an application module 100, a DRM module 110, an authentication module 140, a secure storage module 170, a communication module 180, and a UIM I/F (User Identity Module Interface) module 190.

The application module 100 is a module such as a media player, and serves to reproduce decrypted contents provided from the DRM module 110. The DRM module 110 functions to manage registration, service joining, and use of contents.

The DRM module 110 includes a DRM manager module 115, a registration module 120, a rights management module 125, a key stream management module 130 and a content decryption module 135. Of them, the registration module 120 executes operations according to a registration procedure, the rights management module 125 manages interpretation and use of an RO acquired at the service joining. The key stream management module 130 executes decryption of a traffic key encrypted by a service key in the RO, and the decryption module 135 executes decryption of encrypted contents by using the traffic key. The DRM manager module 115 controls the operation of theses DRM-related modules.

The authentication module 140 manages authentication protocol execution between a user identification module and a network, for example, a service provider, and creates and verifies a message by using its sub-modules. The authentication module 140 includes an authentication manager 145 for taking charge of the overall protocol execution and managing an authentication function, and sub-modules of the authentication manager 145. The sub-modules of the authentication manager 145 includes an encryption/decryption module 150 for executing encryption and decryption operations, a digital signature module 155 for signing an electronic signature, and a MAC (Media Access Control) module 160 for executing a MAC operation.

The DRM module 110 and the authentication module 140 verify a registration response message, which is received from a BSM 40 (e.g., see, FIG. 3) according to an embodiment of the present invention as will be described later, to acquire a group key, acquire an RO from a service joining response message received from the BSM 40 by using the group key, acquire a traffic key by using the RO if a traffic key message is received from a BSD 30, and decrypt encrypted contents transmitted form the BSD 30 by using the acquired traffic key.

The communication module 180 is responsible for transmission/reception with a network. In particular, the communication module 180 functions to receive a message from the network and to transmit a response message in response to the received message. According to an embodiment of the present invention, the communication module 180 receives a message from the BSD 30 over a broadcast channel. Also, according to the present invention, the communication module 180 can optionally transmit and/or receive one or more messages to and/or from the BSM 40 over a bidirectional channel, and receives a traffic key message and encrypted contents from the BSD 30.

The secure storage module 170 stores an encryption key, etc., and the UIM interface module 190 controls of communication with the user identification module (UIM).

Figure 3:
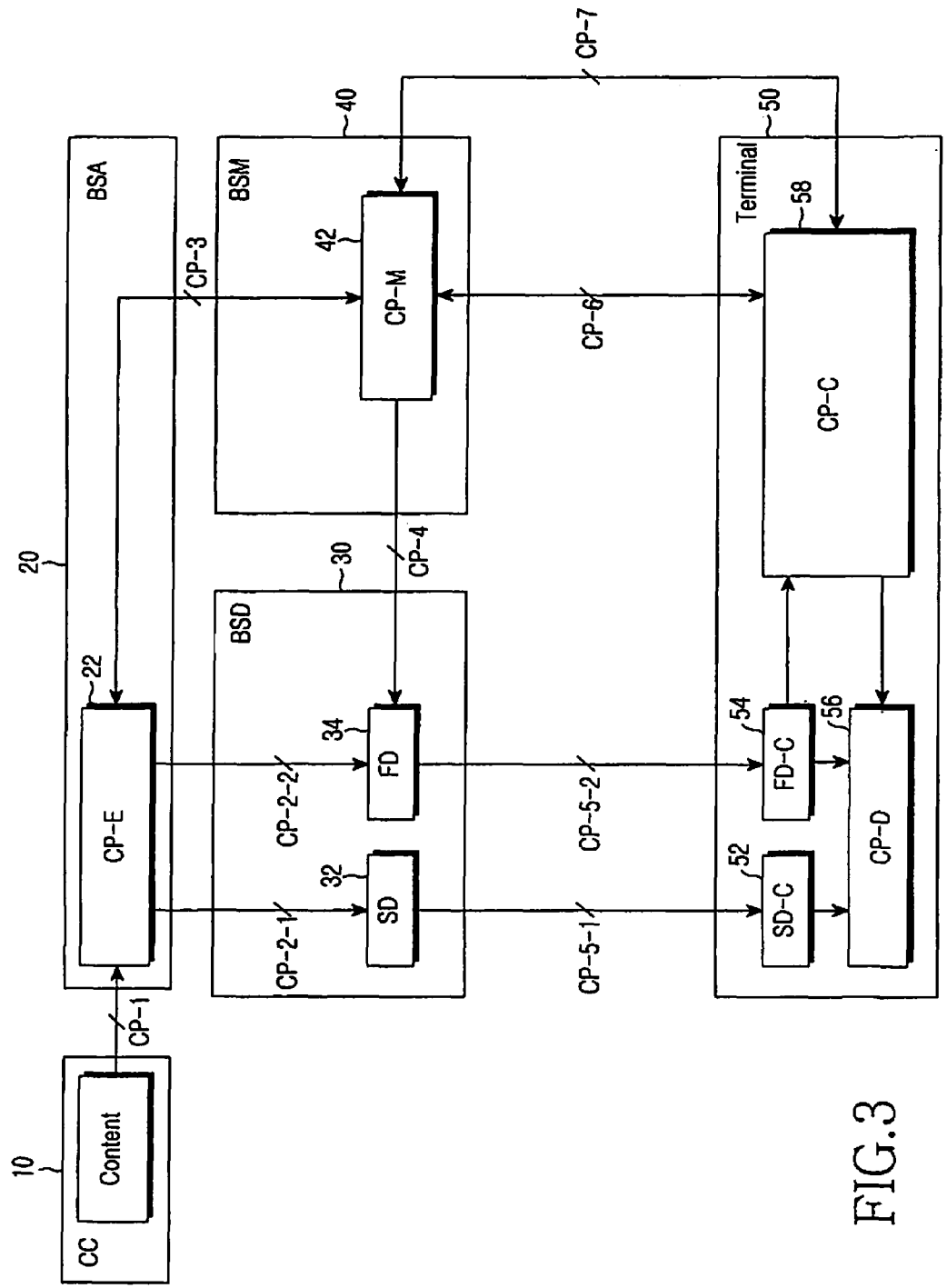
FIG. 3 is a block diagram illustrating a content protection method in a broadcast channel in accordance with the present invention.

Hereinafter, a description will be given of function-by-function entities which execute content protection functions according to a preferred embodiment of the present invention. As shown in FIG. 3, entities for content protection in a broadcast service include a CC (content creator) 10, a BSA 20, a BSD 30, a BSM 40 and a terminal 50. The CC 10 represents a content creation agency for creating contents and a service. The BSA (Broadcast Service Application) 20 represents an application using a broadcast system. The BSD (Broadcast Service Distribution) 30 provides distribution and service protection functions for the broadcast service. The BSM (Broadcast Service Management) 40 executes a broadcast service joining management. The BSD 30 functions to generate a broadcast service through its detailed configuration and to provide the generated broadcast service to the terminal 50. Accordingly, the terminal 50 receives the broadcast service provided from the BSD 30 and reproduces content received from the broadcast service. By delivering the broadcast service to the terminal 50 through the function-by-function entities, the service becomes available to the terminal 50.

Hereinafter, a description will be given of components which exist in the respective entities in order to protect broadcast contents.

A Content Provider-Encryption (CP-E) component 22 encrypts and broadcasts content, and a CP-Management (CP-M) component 42 performs an encryption key creation, a joining management, etc. A Stream Distribution (SD) component 32 broadcasts stream content, and a File Distribution (FD) component 34 broadcasts file content including an encryption message. A SD-Client (C) component 52 transfers the encrypted stream content transmitted from the SD component 32 to a CP-Decryption (D) component 56 for decryption, and a FD-Client (C) component 54 transfers the encrypted file contents transmitted from the SD component 32 to a CP-D component 56 for decryption. A CP-Client (C) component 58 performs registration and joining with the CP-M component 42. In this way, the CP-C component 58 acquires an encryption key used for decrypting encrypted content, and transfers the encryption key to the CP-D component 56. The CP-D component 56 decrypts the encrypted content transmitted from SD-C component 32 or FD-C component 54 by using the encryption key.

Figure 4:
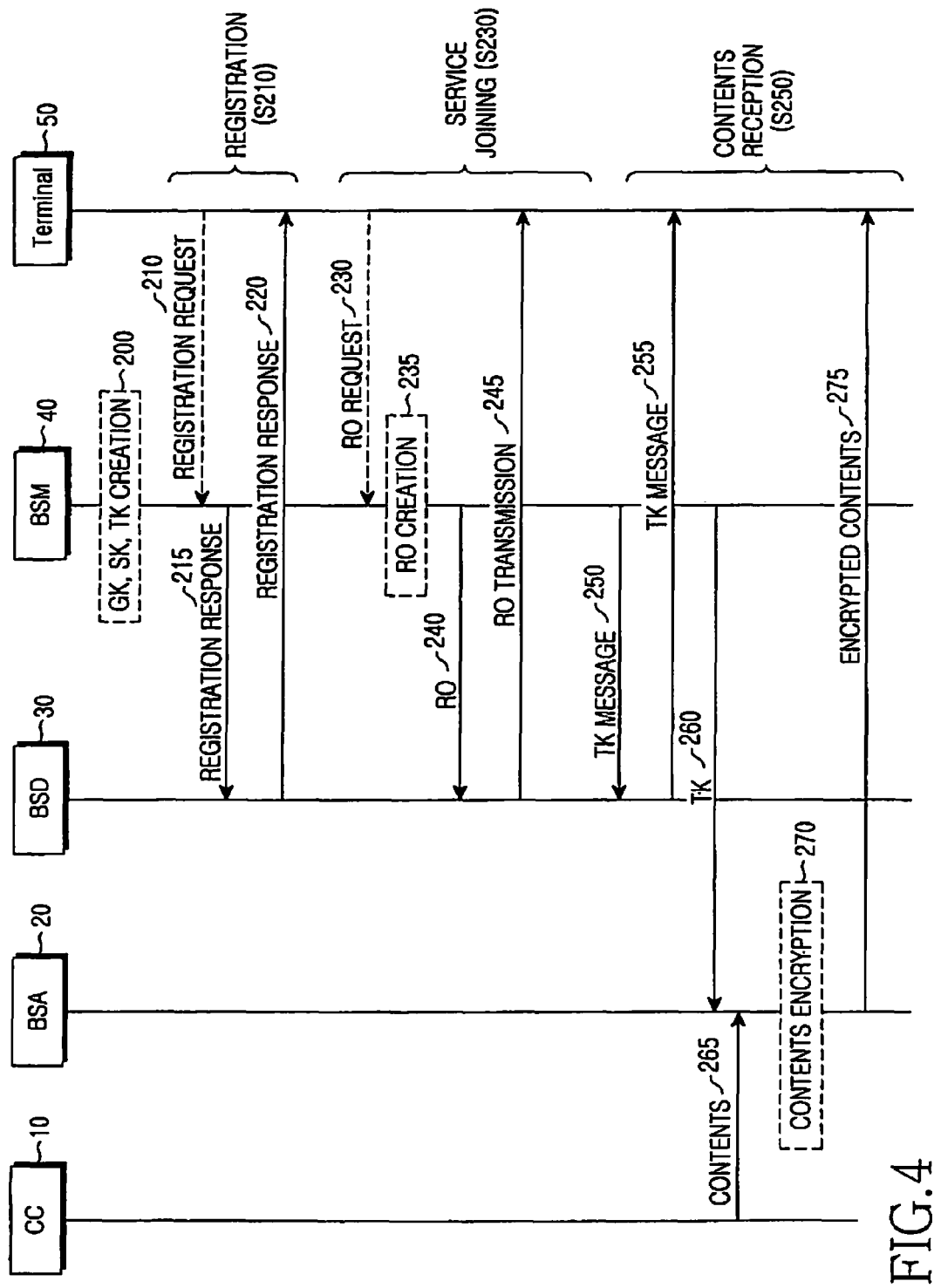
FIG. 4 is a flow chart illustrating the flow of a message transmitted/received according to a content protection scheme in a broadcast channel in accordance with the present invention.

Now, a content protection method through a broadcast channel or a bidirectional channel will be described with reference to FIG. 4 illustrating a contents protection method in a broadcast channel according to the present invention.

First, procedures of executing the registration and service joining of the terminal in order to protect broadcast content will be described with reference to FIGS. 4 and 5.

Referring to FIG. 4, the content protection procedure begins with step 200 in which the BSM 40 creates a Group Key (GK), a Service Key (SK) and a Traffic Key (TK). The Group Key is an encryption key about a group to which the terminal 50 belongs and the Service Key is used for decrypting a encrypted Traffic Key. The Traffic Key is used for encrypting content to transfer to a terminal.

Thereafter, in step 210, the terminal 50 transmits a registration request message to the CP-M component 42 of the BSM 40 in order to be enrolled with the BSM 40. At this time, since the terminal cannot transmit the message directly to the BSM 40 in view of characteristics of the broadcast channel, it transmits the message to the BSM 40 through an out-of-band scheme. An example of the out-of-band scheme may include a scheme in which the terminal 50 transmits the registration request message to the BSM 40 via specific agency such as a PC. The format of the registration request message is shown in FIG. 5A. Referring to FIG. 5A, the format of the registration request message includes a plurality of fields which correspond respectfully with an ID-T representing terminal identification information, an RND(1) representing random numbers information, a TS(1) representing a first time stamp, and a Sign_T representing an electronic signature, of the terminal 50. Among others, in the electronic signature field Sign_T of the terminal 50, information which the terminal signs using its own encryption key is set, thus enabling the BSM 40 to recognize a message transmitted from a specific subscriber. The electronic signature Sign_T is an optional field. If such a registration request message (as shown in FIG. 5A) is received from the terminal 50, the CP-M component 42 of the BSM 40 checks the terminal 50 by using the registration request message. In step 215, the BSM 40 transfers a registration response message, which contains a Group Key (GK) of a corresponding group including the terminal 50, to the FD component 34 of the BSD 30 in response to the registration request message. In step 220, the FD component 34 of the BSD 30 transmits the registration response message to the terminal 50. Such a registration response message has a format as illustrated in FIG. 5B. In FIG. 5B, the registration response message includes information in which a group key has been encrypted with the public key of the terminal 50. This information may be briefly expressed by a formula E(K, D). This formula represents an operation for encrypting data (D) with an encryption key (P). Accordingly, the information, in which the group key (GK) has been encrypted with the public key PK_T of the terminal 50, may be expressed by a formula E(PK_T, GK). Herein, the E represents encryption. After the registration response message is broadcasted, the registration response message passes through the FD-C component 54 of the terminal 50. The terminal 50 checks a subject, which has generated the message, by verifying an electronic signature with a public key PK_T of the terminal 50, and verifies if the message is a correct message. If the terminal 50 fails to verify the message, registration is impossible. However, if the terminal 50 succeeds in verifying the message, it is possible to obtain the group key from the registration response message. The terminal 50 can obtain the group key GK, which is an encryption key corresponding to a subscriber group, through the registration process S210.

In the meantime, if the registration is completed, the CP-C component 58 of the terminal 50 may transmit a service joining request to the CP-M component 42 of the BSM 40. Since such service joining corresponds to a process for obtaining an RO about content, the terminal 50 may transmit an RO request message to the CP-M component 42 of the BSM 40 in step 230. Even in this case, since the terminal 50 cannot directly transmit the message due to the characteristics of a broadcast channel, the terminal 50 transmits the RO request message to the CP-M component 42 of the BSM 40 by using an out-of-band scheme. The RO request message has a format as illustrated in FIG. 5C, which includes an ID_Service field representing the ID of a service which the terminal 50 is to join, an ID_T representing terminal identification information, an RND(3) representing third random numbers information, a TS(3) representing a third time stamp.

In response to the RO request message, the CP-M component 42 of the BSM 40 generates an RO including a pre-generated service key in step 235, and transfers an RO response message, which includes the RO encrypted with a group key, to the FD component 34 of the BSD 30 in step 240. Then, the FD component 34 of the BSD 30 transmits the RO response message, i.e., a service joining response message, to the terminal 50, which has requested the service joining, through a broadcast channel in step 245. If the RO response message is received from the BSD 30, the terminal 50 performs message verification for the RO response message, and decrypts the RO by using the group key obtained through the registration process, thereby obtaining the RO. The RO response message has a format as illustrated in FIG. 5D. As a result, the terminal 50 can obtain the RO through the service joining process 230 as described above.

In step 250, the CP-M component 42 of the BSM 40 transfers a TK message including a traffic key encrypted with a service key to the FD component 34 of the BSD 30. In step 255, the FD component 34 of the BSD 30 broadcasts the TK message to the terminals. The TK message has a format as illustrated in FIG. 5E. After receiving the TK message, the terminal 50 decrypts an encrypted traffic key with a service key, thereby obtaining the traffic key. Herein, the RO obtained through the service joining process includes a service key, so that the terminal 50 can obtain the traffic key by using the service key.

In the meantime, the CC 10 generates content. In step 265, the CC 10 transfers the generated content to the BSA 20. In step 270, the BSA 20 encrypts the received contents by using a traffic key. Herein, the traffic key is generated by the CP-M component 42 of the BSM 40 and is transferred to the CP-E component 22 of the BSA 20 in step 260. Then, the CP-E component 22 of the BSA 20 encrypts the content in step 270 and transmits an encrypted content through a BSD 30 to a terminal in step 275.

If the encrypted contents have a file format, the encrypted content are broadcasted through the FD component 34. If the encrypted content have a stream format, the encrypted content are broadcasted through the SD component 32. The encrypted content have a format as illustrated in FIG. 5f. When the content received in the terminal 50 correspond to stream content, the stream content reach the CP-D component 56 of the terminal 50 via the SD component 32. When the content received in the terminal 50 correspond to file content, the file content reach the CP-D component 56 of the terminal 50 via the FD component 34. Then, the CP-D component 56 decrypts the received content with a traffic key for execution. For example, if the content are decrypted with a traffic key, the decrypted content may be reproduced through the application 100.

In the above description, a case in which a terminal uses encrypted content through a broadcast channel is described. Another embodiment of the present invention describes a case in which a terminal directly requests registration and service joining through a bidirectional channel and uses encrypted content. Hereinafter, a case of using encrypted content will be described with reference to FIG. 6 which is a flow diagram illustrating a content protection method through a bidirectional channel according to another embodiment of the present invention.

Figure 6:
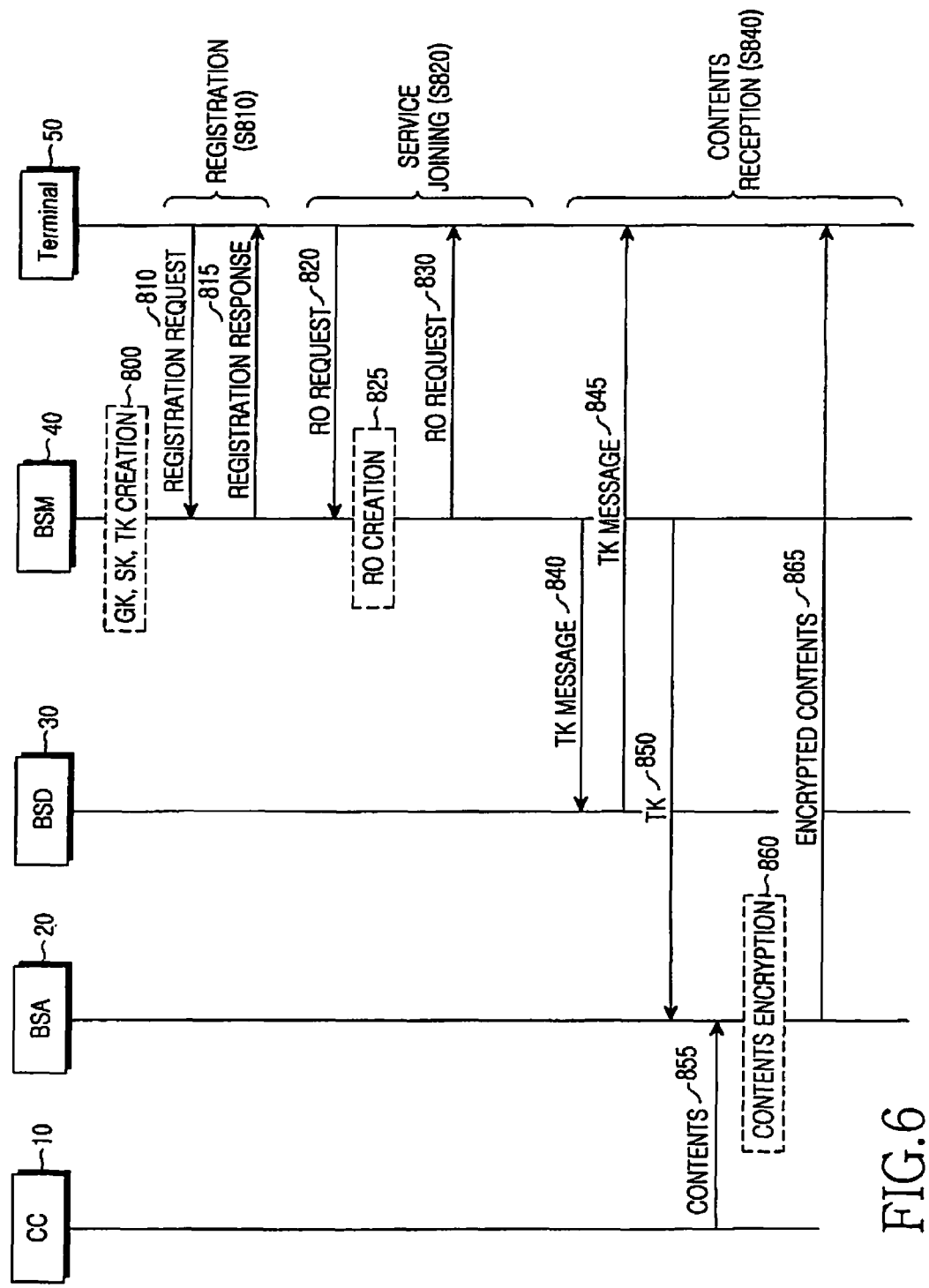
FIG. 6 is a flow diagram illustrating the flow of a message transmitted/received according to a content protection scheme in a bidirectional channel in accordance with the present invention.

Since step 800 in FIG. 6 is the same as step 200 in FIG. 4, and a content reception process including steps 840, 845, 850, 855, 860 and 865 is respectively the same as the content reception process for the sake of clarity including steps 250, 255, 260, 265, 270, and 275, details will be omitted here.

Comparing the content protection method through a bidirectional channel according to the present invention with the content protection method through the broadcast channel according to the present invention, when the broadcast channel is used, the CP-C component 58 of the terminal 50 cannot directly transmit a message to the broadcast network. However, when the bidirectional channel is used, the CP-C component 58 of the terminal 50 can directly transmit a message to the broadcast network. Accordingly, the terminal 50 can directly exchange a message with the CP-M component 42 of the BSM 40. However, when the broadcast channel is used, the CP-M component 42 of the BSM 40 can transmit a message to the terminal 50 only through the BSD 30, and the terminal 50 can transmit a message only through other devices.

In step 810 in FIG. 6, the terminal 50 directly transmits a registration request message to the CP-M component 42 of the BSM 40 through the bidirectional channel. The registration request message has a format as illustrated in FIG. 5A. In step 815, the BSM 40 transmits a registration response message to the terminal 50 through the bidirectional channel in response to the registration request from the CP-C component 58 of the terminal 50. The registration response message has a format as illustrated in FIG. 5B, which includes information corresponding to a group key which has been encrypted by the public key of the terminal 50. Through this encryption, the information can be safely transmitted.

If the registration response message is received from the BSM 40, the terminal 50 must perform verification for the registration response message. To perform the verification for the registration response message, the terminal 50 checks if the message transmitted from the CP-M component 42 of the BSM 40 is a message to be transferred to the terminal 50. Accordingly, if the terminal 50 fails to verify the registration response message, the terminal 50 ignores the registration response message transferred from the BSM 40. However, when the terminal 50 verifies the registration response message, the terminal 50 checks the time field of the registration response message. As a result of this check, if the time field shows a time delayed more than a given value, the terminal 50 ignores the registration response message. If the terminal 50 succeeds in verifying the electronic signature and the time field is determined to be within predefined (e.g., less than the given value), the terminal 50 decrypts a group key with its own public key, thereby obtaining group key.

If the terminal 50 obtains the group key by performing the registration process as described above, the terminal 50 directly transmits a service joining request message, i.e., a message requesting an RO, to the CP-M component 42 of the BSM 40 through the bidirectional channel in step 820.

When a the terminal 50 directly performs a service joining request and obtains content RO from the CP-M component 42 of the BSM 40, terminal 50 is considered to have joined the service. The service joining request message has a format as illustrated in FIG. 5C, which includes the ID of a service which the terminal 50 is to join. The RO generated by the CP-M component 42 of the BSM 40 in step 825 is transmitted to the terminal 50 having performed the service joining request in step 830, and the message transmitted to the terminal 50 has a format as illustrated in FIG. 5D. The RO included in this message has a service key encrypted by a group key for protection. Since the service joining process including steps 820, 825, and 830 in FIG. 6 is different from the service joining process including steps 235, 240, and 245 of FIG. 4, in that the BSM 40 directly transmits a message through the bidirectional channel, details will be omitted.

If the service joining of the terminal 50 is completed through the above-described process, the BSD 30 can transfer the content, which have been received from the CC 10 via the CP-E component 22 of the BSA 20, to the corresponding terminal. In the present invention, an RO and a traffic key message may be provided to a terminal regardless of a time point at which content are provided to the terminal. That is, after content have been previously provided to a terminal, an RO may also be transmitted to the terminal. Otherwise, after an RO has been transmitted to a terminal, content to be executed may be provided to the terminal.

According to the present invention as described above, message exchange and operation are performed between a terminal and entities constituting a broadcast network based on the roles of the terminal and the entities, it is possible to design a system in detail in order to protect content in a broadcast environment.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An inter-acting method between a terminal and entities constituting a broadcast network for protecting content in a broadcast environment including the broadcast network and the terminal, the broadcast network having a Broadcast Service Application (BSA), a Broadcast Service Distribution (BSD), and a Broadcast Service Management (BSM), the inter-acting method comprising:
    transmitting a registration request message for obtaining a group key in a registration process for the terminal from the terminal to the BSM, wherein the group key is encrypted by a public key of the terminal;
    receiving, by the terminal, a registration response message comprising the group key generated by the BSM through a broadcast channel of the BSD;
    requesting a service joining process by the terminal;
    receiving, by the terminal, in response to the service joining request, a message including a Rights Object (RO) corresponding to the content;
    obtaining a service key by decrypting the RO using the group key, the service key being an encryption key assigned when the terminal joins the service;
    if a traffic key message is received in the terminal, obtaining a traffic key from the traffic key message by using the service key, the traffic key being an encryption key used for encrypting the content; and
    receiving and decrypting an encrypted content using the traffic key,
    wherein the service joining process comprises:
    when a service joining request message is received from the terminal, generating, by the BSM, the RO using the service key;
    transferring, by the BSM, a service joining response message including an RO encrypted with the group key to the BSD;
    broadcasting, by the BSD, the service joining response message to the terminal; and
    decrypting, by the terminal, the encrypted RO included in the service joining response message using the obtained group key to obtain the RO.

2. The inter-acting method as claimed in claim 1, wherein the registration process comprises:
    verifying, by the terminal, the registration response message to obtain the group key.

3. The inter-acting method as claimed in claim 2, wherein the terminal corresponds to a terminal using the broadcast channel, and transmits the registration request message to the BSM through a specific agency.

4. The inter-acting method as claimed in claim 2, wherein, when the terminal corresponds to a terminal using a bidirectional channel, the BSM directly transfers the registration response message.

5. The inter-acting method as claimed in claim 2, wherein obtaining the group key comprises:
    when the registration response message is received from the BSD, checking an electronic signature field and a time field included in the registration response message for verification; and
    when the verification is successful, decrypting the encrypted group key included in the registration response message using the public key of the terminal to obtain the group key.

6. The inter-acting method as claimed in claim 1, wherein the service joining process comprises:
    when a service joining request message is received from the terminal through a bidirectional channel, generating, by the BSM, the RO using the service key;
    transferring, by the BSM, a service joining response message including an RO encrypted with the group key to the terminal; and
    decrypting, by the terminal, the encrypted RO included in the broadcasted service joining response message using the obtained group key to obtain the RO.

7. The inter-acting method as claimed in claim 1 wherein the service joining request message includes an IDentification (ID) of a service which the terminal is to join.

8. The inter-acting method as claimed in claim 1, wherein the traffic key is obtained, by the terminal, by decrypting an encrypted traffic key using the service key included in the obtained RO, after the BSM transfers the traffic key message to the BSD, and the BSD transmits the traffic key message to the terminal, the traffic key message including the encrypted traffic key formed by encrypting the traffic key with the service key.

9. The inter-acting method as claimed in claim 1, further comprising:
    receiving, in the BSA, content from a content provider after obtaining the traffic key;
    encrypting the received content using the traffic key; and
    transmitting the encrypted content to the terminal.

10. The inter-acting method as claimed in claim 9, further comprising:
    receiving, by the BSM, a registration request message from the terminal through a specific agency;
    generating a message, including the group key encrypted with the public key of the terminal, in response to reception of the registration request message, and transferring the generated message including the encrypted group key to the BSD; and
    broadcasting, by the BSD, the generated message including the encrypted group key to the terminal.

11. The inter-acting method as claimed in claim 9, further comprising:
    receiving, by the BSM, a registration request message from the terminal; and
    generating, by the BSM, a message including the group key encrypted with the public key of the terminal, in response to reception of the registration request message, and transferring the generated registration response message to the terminal through a bidirectional channel.

12. The inter-acting method as claimed in claim 11, further comprising:
when the terminal corresponds to a terminal using the broadcast channel, transmitting a service joining request message to the BSM through a specific agency;
generating, by the BSM, the RO using the service key, and transferring a service joining response message including an RO encrypted with the group key to the BSD; and
broadcasting, by the BSD, the service joining response message to the terminal.

13. The inter-acting method as claimed in claim 12, wherein the service joining process comprises:
transmitting, by the terminal, a service joining request message to the BSM; and
generating, by the BSM, the RO using the service key, and transferring a service joining response message including an RO encrypted with the group key to the terminal through the bidirectional channel.

14. The inter-acting method as claimed in claim 13, further comprising:
decrypting, by the terminal, the encrypted RO by using the group key, thereby obtaining the RO;
receiving, by the terminal, the traffic key message generated by the BSA through the BSD; and
decrypting an encrypted traffic key using the service key included in the obtained RO after receiving the traffic key message to obtain the traffic key.

15. The inter-acting method as claimed in claim 14, wherein the traffic key message includes an encrypted traffic key generated by encrypting the traffic key with a service key corresponding to an encryption key generated according to the service joining.

16. An inter-acting method between a terminal and entities constituting a broadcast network for protecting content by a Broadcast Service Management (BSM) in a broadcast environment including said broadcast network and said terminal, the broadcast network having a Broadcast Service Application (BSA), a Broadcast Service Distribution (BSD), and the BSM, the inter-acting method comprising:
receiving, by the BSM, a registration request message from the terminal;
determining, by the BSM, a group to which the terminal belongs according to the registration request message and transmitting a registration response message including a group key corresponding to the group to the terminal through a broadcast channel of the BSD;
receiving, by the BSM, a service joining request from the terminal;
transmitting, by the BSM, a Right Object (RO) about the content which can be received based on the group key to the terminal, in response to the service joining request;
generating and transmitting a traffic key message to the BSD and thereby transmitting the traffic key message to the terminal by the BSM; and
transmitting, by the BSM, a traffic key to the BSA, the traffic key being an encryption key used for encrypting content in the BSA and thereby transmitting the encrypted content to the terminal,
wherein the group key is encrypted by a public key of the terminal;
wherein the RO includes a service key which is an encryption key assigned when the terminal joins the service, and
wherein the service joining process comprises:
when a service joining request message is received from the terminal, generating, by the BSM, the RO using the service key;
transferring, by the BSM, a service joining response message including an RO encrypted with the group key to the BSD;
broadcasting, by the BSD, the service joining response message to the terminal; and
decrypting, by the terminal, the encrypted RO included in the service joining response message using the obtained group key to obtain the RO.

17. The inter-acting method as claimed in claim 16, wherein providing the group key comprises:
transmitting a registration response to the terminal in response to the registration request through the BSD, the registration response including the group key corresponding to the group to which the terminal belongs.

18. The inter-acting method as claimed claim 17, wherein transmitting the RO comprises:
when a service joining request is received from the terminal, generating, by the BSM, the RO using a service key; and
transferring, by the BSM, a service joining response including the RO encrypted with the group key to the BSD and thereby broadcasting the service joining response to the terminal, wherein the RO is decrypted in the terminal using the group key.

19. The inter-acting method as claimed in claim 18, wherein the traffic key message includes an encrypted traffic key formed by encrypting the traffic key with a service key.

20. The inter-acting method as claimed in claim 19, wherein the content is received in the BSA from a content provider.

21. An inter-acting terminal for protecting content in a broadcast environment, the inter-acting terminal comprising:
a registration module for receiving a group key in a registration process;
a digital rights management module for performing a registration process;
a communication module for transmitting a registration request message for acquiring the group key for the terminal, the group key being encrypted by a public key of the terminal, and receiving a registration response message comprising the group key generated by a Broadcast Service Management (BSM) via a broadcast channel of a Broadcast Service Distribution (BSD),
receiving a message including a Rights Object (RO) corresponding to the content in response to a service joining request;
a rights management module for obtaining a service key by decrypting the RO using the group key; and
a key stream management module for obtaining a traffic key from a traffic key message by using the service key, and decrypting an encrypted content using the traffic key,
wherein the service key is an encryption key assigned when the terminal joins the service;
wherein the traffic key is an encryption key used for encrypting the content; and
wherein the service joining process comprises:
when a service joining request message is received from the terminal, generating, by the BSM, the RO using the service key;
transferring, by the BSM, a service joining response message including an RO encrypted with the group key to the BSD;

broadcasting, by the BSD, the service joining response message to the terminal; and decrypting, by the terminal, the encrypted RO included in the service joining response message using the obtained group key to obtain the RO.

22. The inter-acting terminal as claimed in claim 21, wherein the communication module receives the traffic key message and the encrypted content.

23. The inter-acting terminal as claimed in claim 21, further comprising an authentication module for verifying the received registration response to obtain the group key.

24. The inter-acting terminal as claimed in claim 23, wherein the authentication module checks the electronic signature field and a time field included in the registration response for verification, and the key stream management module decrypts the group key included in the registration response message using the public key of the terminal to obtain the group key when the verification is successful.

25. The inter-acting terminal as claimed in claim 23, further comprising a content decryption module for decrypting encrypted content with the traffic key, wherein the content is encrypted by a Broadcast Service Application (BSA) using the traffic key when the content is transmitted from a content provider to the BSA.

* * * * *